United States Patent
Keturakis

(10) Patent No.: US 12,065,958 B2
(45) Date of Patent: Aug. 20, 2024

(54) SYSTEMS AND METHODS FOR RECOVERING CATALYST PERFORMANCE

(71) Applicant: Cummins Emission Solutions Inc., Columbus, IN (US)

(72) Inventor: Christopher John Keturakis, Arlington Heights, IL (US)

(73) Assignee: Cummins Emission Solutions Inc., Columbus, IN (US)

( * ) Notice: Subject to any disclaimer, the term of this patent is extended or adjusted under 35 U.S.C. 154(b) by 396 days.

(21) Appl. No.: 17/631,353

(22) PCT Filed: Jul. 14, 2020

(86) PCT No.: PCT/US2020/041893
§ 371 (c)(1),
(2) Date: Jan. 28, 2022

(87) PCT Pub. No.: WO2021/021426
PCT Pub. Date: Feb. 4, 2021

(65) Prior Publication Data
US 2022/0325648 A1    Oct. 13, 2022

Related U.S. Application Data

(60) Provisional application No. 62/880,824, filed on Jul. 31, 2019.

(51) Int. Cl.
*F01N 3/20* (2006.01)
*B01D 53/94* (2006.01)
(Continued)

(52) U.S. Cl.
CPC ........... *F01N 3/2066* (2013.01); *B01J 23/22* (2013.01); *B01J 23/92* (2013.01);
(Continued)

(58) Field of Classification Search
CPC .......... F01N 3/021; F01N 3/08; F01N 3/0807; F01N 3/0814; F01N 3/0828;
(Continued)

(56) References Cited

U.S. PATENT DOCUMENTS 8,791,038 B2   7/2014   Xu et al.
10,207,253 B1  2/2019   Inokawa et al.
(Continued)

FOREIGN PATENT DOCUMENTS

EP   1 815 907   8/2007

OTHER PUBLICATIONS

First Examination Report issued for Indian Patent Application No. IN 202247003769 issued Mar. 9, 2022, 5 pages.
(Continued)

*Primary Examiner* — Binh Q Tran
(74) *Attorney, Agent, or Firm* — Foley & Lardner LLP

(57) ABSTRACT

A method of recovering catalyst performance includes providing a vanadium selective catalytic reduction (VSCR) catalyst. The method includes exposing the VSCR catalyst to a first humidity level in a range of 50%-100% relative humidity, at a first temperature in a range of 20° C.-100° C., for a first period of time of at least two hours. The method includes thermally treating the VSCR catalyst at a second temperature in a range of 300° C.-600° C. for a second period of time of at least than one hour.

20 Claims, 5 Drawing Sheets

(51) Int. Cl.
*B01J 23/22* (2006.01)
*B01J 23/92* (2006.01)
*F01N 3/08* (2006.01)
*F01N 9/00* (2006.01)
*F01N 11/00* (2006.01)

(52) U.S. Cl.
CPC ...... *B01D 53/9418* (2013.01); *B01D 53/9422* (2013.01); *B01D 2255/20723* (2013.01); *F01N 3/0814* (2013.01); *F01N 3/0871* (2013.01); *F01N 3/0885* (2013.01); *F01N 9/005* (2013.01); *F01N 11/005* (2013.01); *F01N 2260/04* (2013.01); *F01N 2370/02* (2013.01); *F01N 2560/026* (2013.01); *F01N 2560/028* (2013.01); *F01N 2570/22* (2013.01); *F01N 2900/1404* (2013.01); *F01N 2900/1602* (2013.01); *F01N 2900/1614* (2013.01)

(58) Field of Classification Search
CPC .... F01N 3/0842; F01N 3/0871; F01N 3/0885; F01N 3/10; F01N 3/2006; F01N 3/206; F01N 3/2066; F01N 3/2073; F01N 3/208; F01N 3/20; F01N 9/00; F01N 9/005; F01N 11/005; F01N 2240/18; F01N 2250/12; F01N 2260/04; F01N 2370/02; F01N 2550/03; F01N 2560/026; F01N 2560/028; F01N 2560/08; F01N 2570/14; F01N 2570/145; F01N 2570/22; F01N 2610/02; F01N 2900/1404; F01N 2900/1602; F01N 2900/1614; F01N 2900/1622; F01N 2900/1626; B01D 53/864; B01D 53/96; B01D 53/9422; B01D 53/9418; B01D 53/9477; B01D 2251/2067; B01D 2255/20707; B01D 2255/20723; B01D 2255/20776; B01D 2258/012; Y02A 50/20; Y02T 10/12; Y02T 10/40; B01J 23/20; B01J 23/22; B01J 23/64; B01J 23/92; B01J 29/78; B01J 38/36
See application file for complete search history.

(56) References Cited

U.S. PATENT DOCUMENTS

| | | |
|---|---|---|
| 10,934,918 B1 * | 3/2021 | Goffe ................ B01D 53/9427 |
| 2002/0058586 A1 | 5/2002 | Choi et al. |
| 2002/0070124 A1 * | 6/2002 | Andrews ................ F02B 47/02 |
| | | 205/628 |
| 2003/0066285 A1 * | 4/2003 | Raybone .................. B01J 23/50 |
| | | 60/275 |
| 2004/0101452 A1 * | 5/2004 | LaBarge ............. B01D 53/864 |
| | | 422/177 |
| 2007/0220873 A1 * | 9/2007 | Bosteels .................. F01N 3/10 |
| | | 60/299 |
| 2009/0143225 A1 | 6/2009 | Ha et al. |
| 2013/0331259 A1 | 12/2013 | Chapman |
| 2014/0371054 A1 | 12/2014 | Whitt et al. |
| 2015/0098870 A1 * | 4/2015 | Lambert ............ B01D 53/8628 |
| | | 502/67 |
| 2016/0333761 A1 | 11/2016 | Liu et al. |
| 2018/0002183 A1 * | 1/2018 | Davis ................. B01D 53/9418 |
| 2018/0141034 A1 | 5/2018 | Hong et al. |
| 2019/0321783 A1 * | 10/2019 | Yang ....................... B01J 23/58 |

OTHER PUBLICATIONS

Nojima, Shigeru, et al. "Development of $NO_x$ Removal SCR Catalyst for Low $SO_2$ Oxidation." Mitubishi Heavy Industries, Ltd., Technical Review, vol. 38 No. 2 (Jun. 2001) pp. 87-91.
International Search Report and Written Opinion for PCT Application No. PCT/US2020/041893, issued Oct. 9, 2020, 17 pages.
Nojima et al., "Development of NOx Removal SCR Catalyst for Low SO2 Oxidation" Mitubishi Heavy Industries, Ltd., Technical Review, Jun. 2001, 38(2):87-91.
Vuurman et al., "Structural Determination of Supported V2O5-WO3/TiO2 Catalysts by in Situ Raman Spectroscopy and X-ray Photoelectron Spectroscopy," J. Phys. Chem. 1991, 95, 9928-9937.
Burcham, et al., "In situ IR, Raman, and UV-Vis DRS spectroscopy of supported vanadium oxide catalysts during methanol oxidation," Topics in Catalysis 11/12 (2000) 85-100.

* cited by examiner

SYSTEMS AND METHODS FOR RECOVERING CATALYST PERFORMANCE

CROSS-REFERENCE TO RELATED APPLICATIONS

The present application is a National Phase of PCT Application No. PCT/US2020/041893, filed Jul. 14, 2020, which claims the benefit of U.S. Provisional Application No. 62/880,824, filed Jul. 31, 2019. The contents of these applications are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a liquid reductant. The catalyst may be included in a catalyst chamber of an exhaust system, such as that of a vehicle or power generation unit. A liquid reductant, such as anhydrous ammonia, aqueous ammonia, diesel exhaust fluid (DEF), or aqueous urea, is typically introduced into the exhaust gas flow prior to the catalyst chamber.

In some applications, vanadium SCR catalysts can become deactivated through the sintering or clumping of surface vanadium oxide into larger clusters of vanadium oxide.

SUMMARY

Embodiments described herein relate generally to systems and methods for recovering catalyst performance.

In some embodiments, a method of recovering catalyst performance includes providing a vanadium selective catalytic reduction (VSCR) catalyst; exposing the VSCR catalyst to a first humidity level in a range of 50%-100% relative humidity, at a first temperature in a range of 20° C.-100° C., for a first period of time of at least two hours; and thermally treating the VSCR catalyst at a second temperature in a range of 300° C.-600° C. for a second period of at least one hour.

In some embodiments, the first humidity level is in a range of 50%-95% relative humidity. In some embodiments, the second temperature is in a range of 400° C.-600° C. In some embodiments, the second temperature is in a range of 500° C.-600° C. In some embodiments, in the step of providing the VSCR catalyst, the VSCR catalyst includes clusters of vanadium oxide. In some embodiments, the step of exposing the VSCR catalyst to the first humidity level disperses the vanadium oxide.

In some embodiments, the first period of time includes at least 5 hours. In some embodiments, the second period of time includes less than or equal to 48 hours. In some embodiments, the step of providing the VSCR catalyst includes providing the VSCR catalyst as part of a vehicle system. In some embodiments, the step of providing the VSCR catalyst includes providing the VSCR catalyst in an environmental chamber.

In some embodiments, a method of manufacturing vanadium selective catalytic reduction (VSCR) catalyst includes sintering vanadium oxide; exposing the vanadium oxide to a first humidity level in a range of 50%-100% relative humidity, at a first temperature in a range of 20° C.-100° C., for a first period of time of at least two hours; and thermally treating the vanadium oxide at a second temperature in a range of 300° C.-600° C. for a second period of time of at least one hour.

In some embodiments, the first humidity level is in a range of 50%-95% relative humidity. In some embodiments, the second temperature is in a range of 400° C.-600° C. In some embodiments, the second temperature is in a range of 500° C.-600° C. In some embodiments, the vanadium oxide includes clusters of vanadium oxide. In some embodiments, the step of exposing the vanadium oxide to the first humidity level disperses the clusters of vanadium oxide. In some embodiments, the first period of time includes at least 5 hours. In some embodiments, the second period of time includes less than or equal to 48 hours. In some embodiments, the first humidity level is in a range of 70%-95% relative humidity.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for recovering catalyst performance. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an aftertreatment system. This treatment often includes treating (e.g., dosing, etc.) the exhaust gases with a reductant and an SCR catalyst to convert NO$_x$ emissions to more neutral compounds. In some applications, high temperatures for sustained periods of time can lead to inactivation of vanadium SCR catalysts, which can reduce system performance.

Implementations described herein relate to a method of recovering catalyst performance that includes providing a vanadium selective catalytic reduction (VSCR) catalyst. The method can include exposing the VSCR catalyst to a first humidity level in a range of 50%-100% relative humidity, at a first temperature in a range of 20° C.-100° C., for a first period of time of at least two hours. The method can include thermally treating the VSCR catalyst at a second temperature in a range of 300° C.-600° C. for a second period of time of at least one hour.

The method described herein may recover the performance of the VSCR catalyst and extend the lifetime of the VSCR catalyst, which can decrease cost by delaying or avoiding replacement of the VSCR catalyst entirely.

II. Overview of Aftertreatment System

Figure 1:
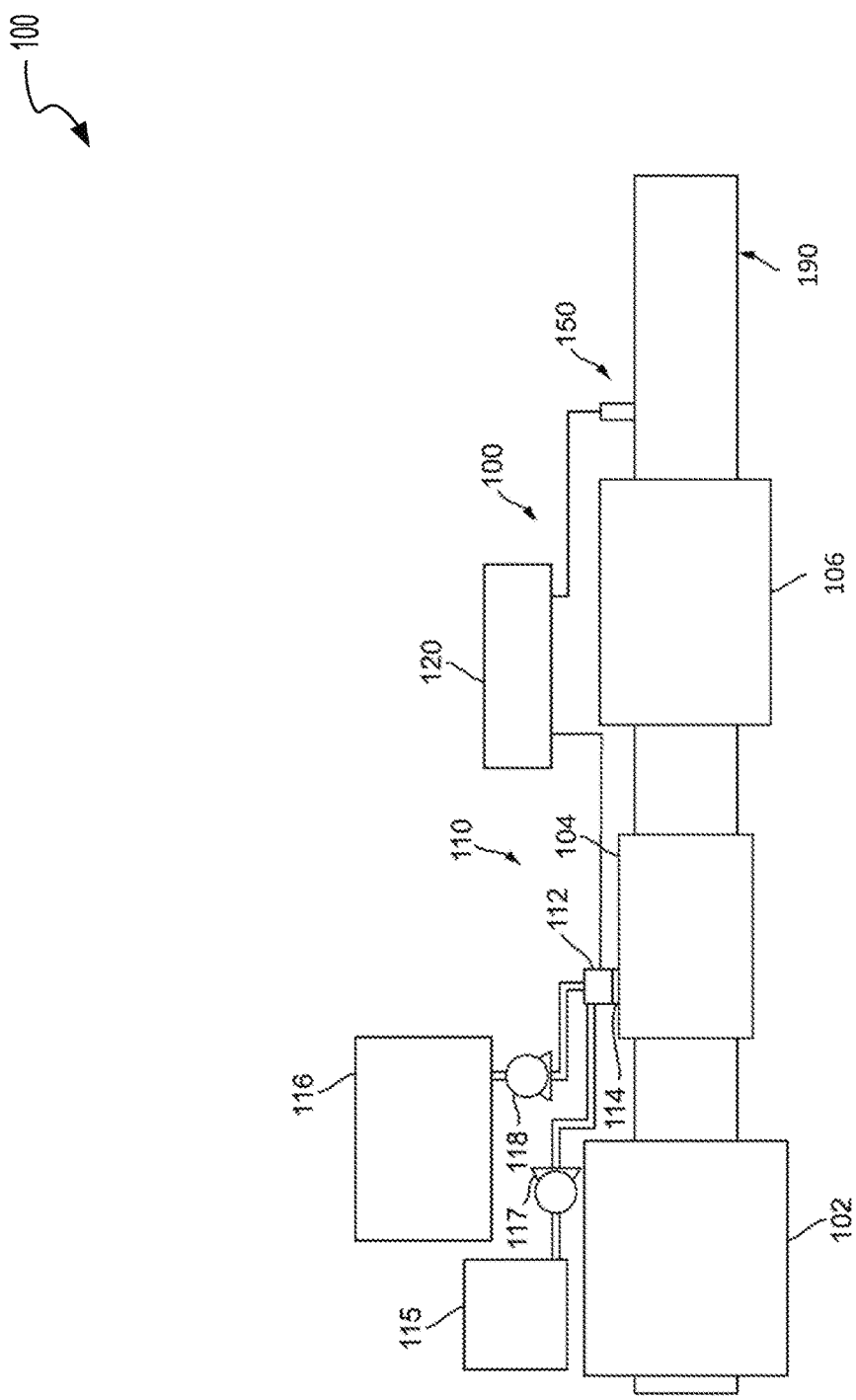
FIG. 1 illustrates a block diagram of an example aftertreatment system having an example reductant delivery system for an exhaust system, according to an embodiment.

FIG. 1 depicts an aftertreatment system 100 having an example reductant delivery system 110 for an exhaust system 190. The exhaust system 190 receives exhaust gasses from an internal combustion engine (e.g., diesel internal combustion engine, etc.). The aftertreatment system 100 includes a particulate filter (e.g., a diesel particulate filter (DPF) 102), the reductant delivery system 110, a decomposition chamber 104 (e.g., reactor, etc.), and a selective catalytic reduction unit 106 (e.g. catalyst chamber). The selective catalytic reduction (SCR) unit 106 can contain a catalyst (e.g. SCR catalyst, VSCR catalyst). The aftertreatment system 100 may also include a sensor 150.

The DPF 102 is configured to remove particulate matter, such as soot, from exhaust gas flowing in the exhaust system 190. The DPF 102 includes an inlet, where the exhaust gas is received (e.g., from an engine manifold, etc.), and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a dosing module 112 (e.g., doser, etc.) configured to dose the reductant into the decomposition chamber 104. In some implementations, the reductant is injected upstream of the SCR unit 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NO$_x$ emissions and an outlet for the exhaust gas, NO$_x$ emissions, ammonia, and/or reductant to flow to the SCR unit 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116 (e.g., tanks, vessels, etc.). In some implementations, a pump 118 may be used to pressurize the reductant from the reductant sources 116 for delivery to the dosing module 112.

The dosing module 112 is also fluidly coupled to one or more air sources 115. For example, the air sources 115 may be an air intake or air storage device (e.g., tank, etc.). A pump 117 (e.g., lift pump, etc.) is used to pressurize the air from the air sources 115 for delivery to the dosing module 112 (e.g., via pressurized conduits, etc.). The dosing module 112 mixes the air from the air sources 115 and the reductant from the reductant sources 116 and provides the air-reductant mixture into the decomposition chamber 104.

The dosing module 112, the pump 117, and the pump 118 are also electrically or communicatively coupled to a controller 120. The controller 120 is configured to control the dosing module 112 to dose the air-reductant mixture into the decomposition chamber 104. The controller 120 may also be configured to control the pump 117 and/or the pump 118. For example, the controller 120 may control the pump 117 and the pump 118 to obtain a target mixture of air and reductant that is provided to the decomposition chamber 104. In some implementations, the pump 117 and the air sources 115 may be omitted. In these implementations, the dosing module 112 does not receive pressurized air.

The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR unit 106 is configured to assist in the reduction of NO$_x$ emissions by accelerating a NO$_x$ reduction process between the ammonia and the NO$_x$ of the exhaust gas into diatomic nitrogen, water, and/or carbon dioxide. The SCR unit 106 includes an inlet in fluid communication with the decomposition chamber 104 from which exhaust gas and reductant are received and an outlet in fluid communication with an end of the exhaust system 190. The SCR unit 106 can include a VSCR catalyst.

The exhaust system 190 may further include an oxidation catalyst (for example a diesel oxidation catalyst (DOC)) in fluid communication with the exhaust system 190 (e.g., downstream of the SCR unit 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR unit 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR unit 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR unit 106, within the SCR unit 106, or downstream of the SCR unit 106. In addition, two or more sensors 150 may be utilized for detecting a condition of the exhaust gas, such as two, three, four, five, or six sensors 150 with each sensor 150 located at one of the foregoing positions of the exhaust system 190. In some implementations, the sensors 150 may be omitted.

III. Example Method for Recovering Catalyst Performance

Figure 2:
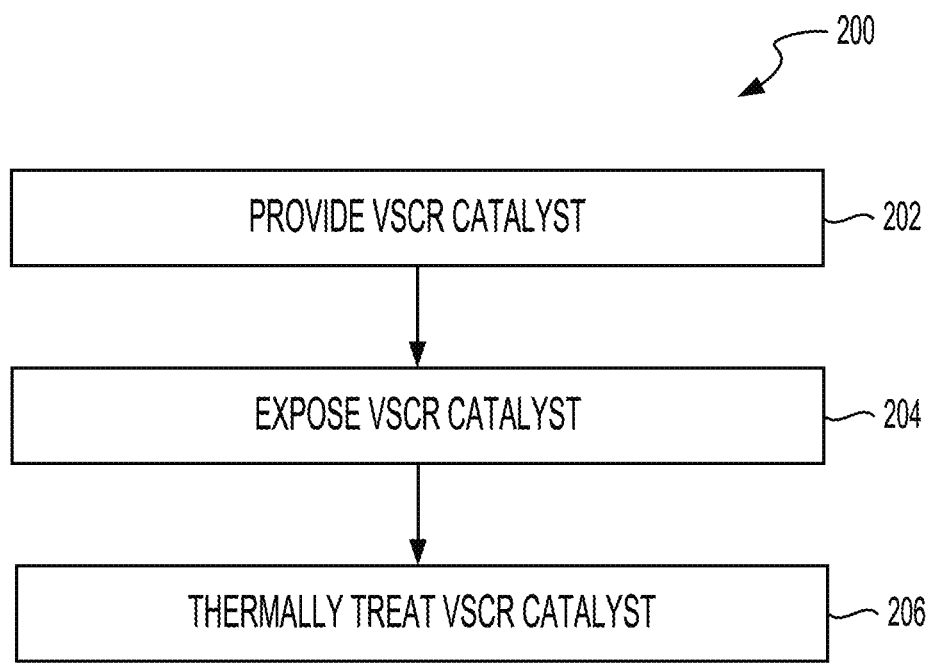
FIG. 2 illustrates a flow chart of an example method of recovering catalyst performance, according to an embodiment.

FIG. 2 illustrates a flow chart of an example method of recovering catalyst performance, according to an embodiment. In brief overview, the method 200 includes providing a VSCR catalyst (STEP 202); exposing the VSCR catalyst to a first humidity level in a range of 50%-100% relative humidity, at a first temperature in a range of 20° C.-100° C., for a first period of time of at least two hours (STEP 204); and thermally treating the VSCR catalyst at a second temperature in a range of 300° C.-600° C. for a second period of time of at least one hour (STEP 206).

In the step of providing the VSCR catalyst (STEP 202), the VSCR catalyst may include clusters of vanadium oxide. For example, the clusters of vanadium oxide can include vanadium(II) oxide, vanadium(III) oxide, vanadium(IV) oxide, vanadium(V) oxide, phases of vanadium oxide with the formula $V_nO_{2n+1}$ (e.g., $V_2O_5$, $V_3O_7$, $V_4O_9$, and $V_6O_{13}$), phases of vanadium oxide with the formula $V_nO_{2n-1}$ (e.g., $V_4O_7$, $V_5O_9$, $V_6O_{11}$, $V_7O_{13}$, and $V_8O_{15}$), or non-stoichiometric phases of vanadium oxide. In some embodiments, the method 200 includes providing the VSCR catalyst as part of a vehicle system. The VSCR catalyst can include a vanadium based SCR catalyst. The VSCR catalyst can convert $NO_x$ emissions to more neutral compounds.

As discussed above, the method 200 includes exposing the VSCR catalyst to a first humidity level in a range of 50%-100% relative humidity, at a first temperature in a range of 20° C.-100° C., for a first period of time of at least two hours (STEP 204). The first humidity level may be in a range of 50%-95% relative humidity, or in a range of 70%-95% relative humidity, or in a range of 80%-95% relative humidity. The step of exposing the VSCR catalyst to the first humidity level can disperse clustered vanadium oxide. Exposing the VSCR catalyst to the first humidity level can disperse the clusters of vanadium oxide. The first temperature may be in a range of 20° C.-80° C., or in a range of 30° C.-70° C., or in a range of 40° C.-60° C. The first period of time may be at least 2 hours, or at least 3 hours, or at least 4 hours, or at least 5 hours, or at least 10 hours, or at least 1 day, or at least 2 days, or at least 1 week, or at least 2 weeks, or at least 1 month.

As discussed above, the method 200 includes thermally treating the VSCR catalyst at a second temperature in a range of 300° C.-600° C. for a second period of time of at least one hour (STEP 206). The second temperature may be in a range of 400° C.-600° C., or in a range of 500° C.-600° C., in a range of 525° C.-600° C., or in a range of 525° C.-575° C. The second period of time may be at least 2 hours, or at least 3 hours, or at least 4 hours, or at least 5 hours. The second period of time may be less than or equal to 48 hours.

In some embodiments, the VSCR catalyst is removed from the aftertreatment system 100 of a vehicle before performing the method 200. For example, the VSCR catalyst may be removed from the aftertreatment system 100 of the vehicle and placed in an environmental chamber (e.g., climate chamber, climatic chamber, etc.) to perform the method 200. The environmental chamber can include an enclosure with a controlled temperature and humidity.

In other embodiments, the VSCR catalyst may be left in the vehicle while the method 200 is performed. For example, the vehicle may be parked in an atmosphere having the first humidity and first temperature for the first period of time, and the VSCR catalyst can then be thermally treated at the second temperature for the second period of time while the VSCR catalyst remains on the vehicle. The thermal treatment can be performed as part of an active regeneration in which a fuel dosing valve injects fuel into the exhaust system 190 to raise the temperature. The thermal treatment can be performed as part of a regeneration process specifically tailored to regenerate catalyst performance.

Figure 3:
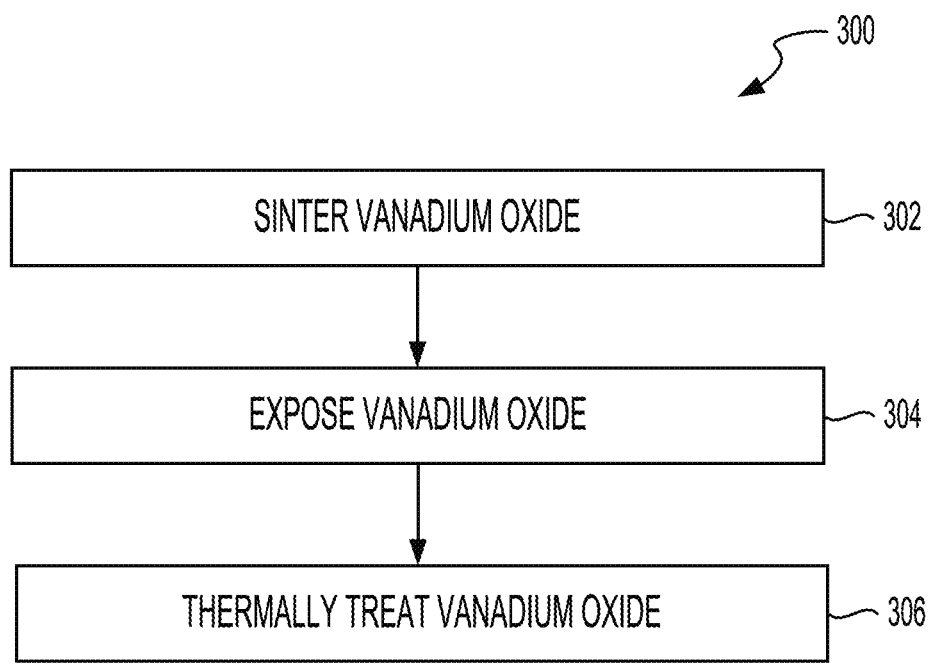
FIG. 3 illustrates a flow chart of an example method of manufacturing VSCR catalyst, according to an embodiment.

FIG. 3 illustrates a flow chart of an example method of manufacturing VSCR catalyst, according to an embodiment. In brief overview, the method 300 includes sintering vanadium oxide (STEP 302); exposing the vanadium oxide to a first humidity level in a range of 50%-100% relative humidity, at a first temperature in a range of 20° C.-100° C., for a first period of time of at least two hours (STEP 304); and thermally treating the vanadium oxide at a second temperature in a range of 300° C.-600° C. for a second period of time of at least one hour (STEP 306).

In the step of sintering vanadium oxide (STEP 302), the vanadium oxide may include clusters of vanadium oxide. For example, the vanadium oxide can include vanadium(II) oxide, vanadium(III) oxide, vanadium(IV) oxide, vanadium (V) oxide, phases of vanadium oxide with the formula $V_nO_{2n+1}$ (e.g., $V_2O_5$, $V_3O_7$, $V_4O_9$, and $V_6O_{13}$), phases of vanadium oxide with the formula $V_nO_{2n-1}$ (e.g., $V_4O_7$, $V_5O_9$, $V_6O_{11}$, $V_7O_{13}$, and $V_8O_{15}$), or non-stoichiometric phases of vanadium oxide.

As discussed above, the method 300 includes exposing the vanadium oxide to a first humidity level in a range of 50%-100% relative humidity, at a first temperature in a range of 20° C.-100° C., for a first period of time of at least two hours (STEP 304). The first humidity level may be in a range of 50%-95% relative humidity, or in a range of 70%-95% relative humidity, or in a range of 80%-95% relative humidity. The step of exposing the vanadium oxide to the first humidity level can disperse the clustered vanadium oxide. The first temperature may be in a range of 20° C. to 80° C., or in a range of 30° C. to 70° C., or in a range of 40° C. to 60° C. The first period of time may be at least 3 hours, or at least 4 hours, or at least 5 hours, or at least 10 hours, or at least 1 day, or at least 2 days, or at least 1 week, or at least 2 weeks, or at least 1 month.

As discussed above, the method 300 includes thermally treating the vanadium oxide at a second temperature in a range of 300° C.-600° C. for a second period of time of at least one hour (STEP 306). The second temperature may be in a range of 400° C.-600° C., or in a range of 500° C.-600° C., in a range of 525° C.-600° C., or in a range of 525° C.-575° C. The second period of time may be at least 2 hours, or at least 3 hours, at least 4 hours, or at least 5 hours. The second period of time may be less than or equal to 48 hours.

Figure 4:
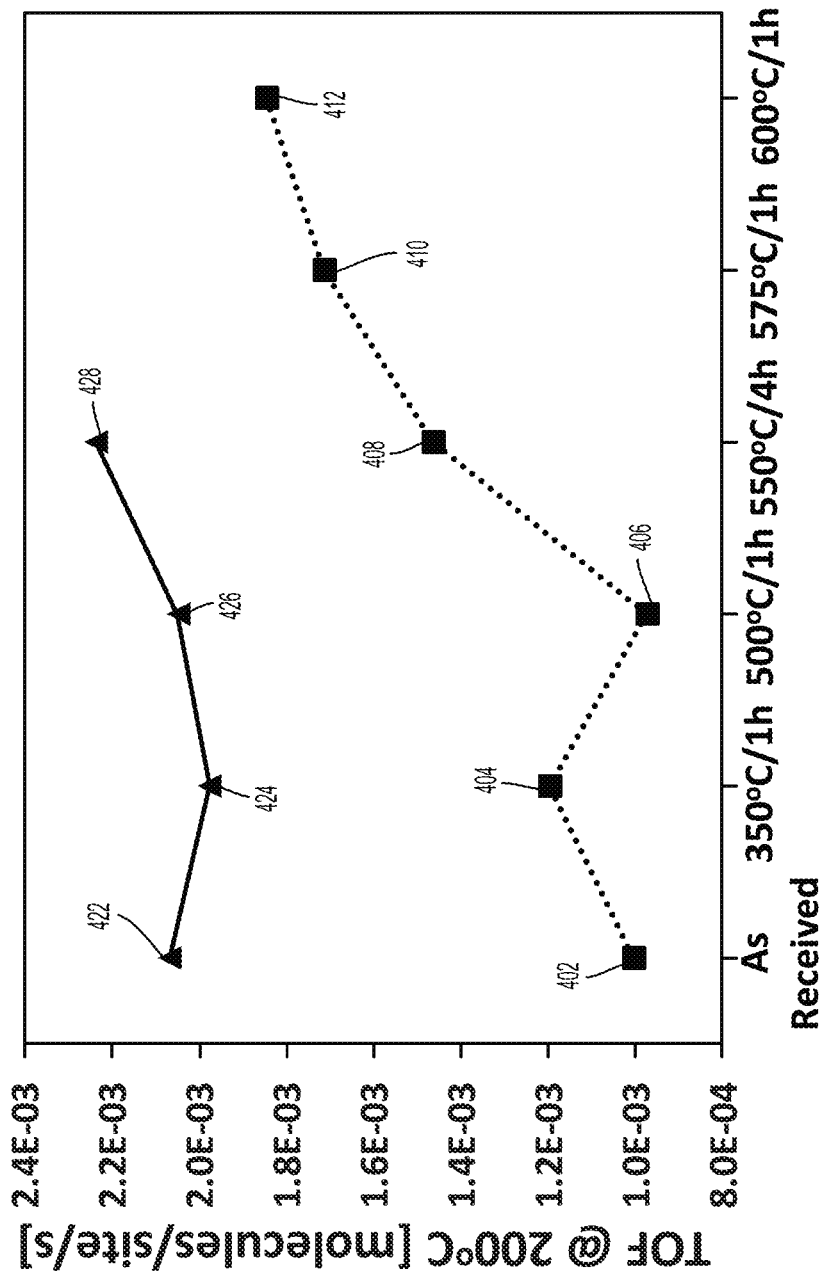
FIG. 4 illustrates a plot of turnover frequency and various samples, according to an embodiment.

FIG. 4 illustrates a plot of turnover frequency (TOF) and various catalyst samples, according to an embodiment. The turnover frequency represents the normalized reactivity of a catalyst. A subset of the samples tested were sintered at various temperatures (a process known as degreening) to stabilize the performance of the catalyst. The samples were prepared under the following conditions. Sample 402 was exposed to the first humidity level of 95% relative humidity, at the first temperature of 40° C., for the first period of time of two weeks and was not thermally treated. Sample 404, sample 406, sample 408, sample 410, and sample 412 were exposed to the first humidity level of 95% relative humidity, at the first temperature of 40° C., for the first period of time of two weeks. In addition, sample 404 was thermally treated (e.g., degreened) at a temperature of 350° C. for 1 hour. Sample 406 was thermally treated at a temperature of 500° C. for 1 hour. Sample 408 was thermally treated at a temperature of 550° C. for 4 hours. Sample 410 was thermally treated at a temperature of 575° C. for 1 hour. Sample 412 was thermally treated at a temperature of 600° C. for 1 hour. Sample 422 was not exposed to the first humidity level and was not thermally treated. Sample 424, sample 426, and sample 428 were not exposed to the first humidity level and were thermally treated. Sample 424 was thermally treated at a temperature of 350° C. for 1 hour. Sample 426 was thermally treated at a temperature of 500° C. for 1 hour. Sample 428 was thermally treated at a temperature of 550° C. for 4 hours.

The plot shows catalyst reactivity represented as a turnover frequency. The turnover frequencies of the catalysts were measured at 200° C. The plot indicates a catalyst exposed to the first humidity level for the first period of time under a given thermal treatment condition had a lower turnover frequency, and therefore reactivity, than a catalyst that was not exposed to the first humidity level for the first period of time under the same thermal treatment condition. For example, sample 424 has a higher turnover frequency than sample 404, the latter having been exposed to the first humidity level for the first period of time. Additionally, higher temperature thermal treatments are generally correlated with higher turnover frequencies for samples exposed to the first humidity level for the first period of time, suggesting that catalytic sites increased in efficiency as thermal treatments increased in temperature. However, sample 406, which was thermally treated at a temperature of 500° C. for 1 hour, had a lower turnover frequency than sample 404, which was thermally treated at a temperature of 350° C. for 1 hour. Such results indicate that for a mild degreening processes, in which the temperature is between approximately 350° C. and 550° C., the reactivity of the catalyst can decrease compared with lower temperature degreening processes. For a higher temperature degreening process, in which the temperature is approximately greater than 550° C., the reactivity of the catalyst can increase compared with lower temperature degreening processes. In the example shown in FIG. 4, the turnover frequency is reduced at 500 degrees Celsius.

Figure 5:
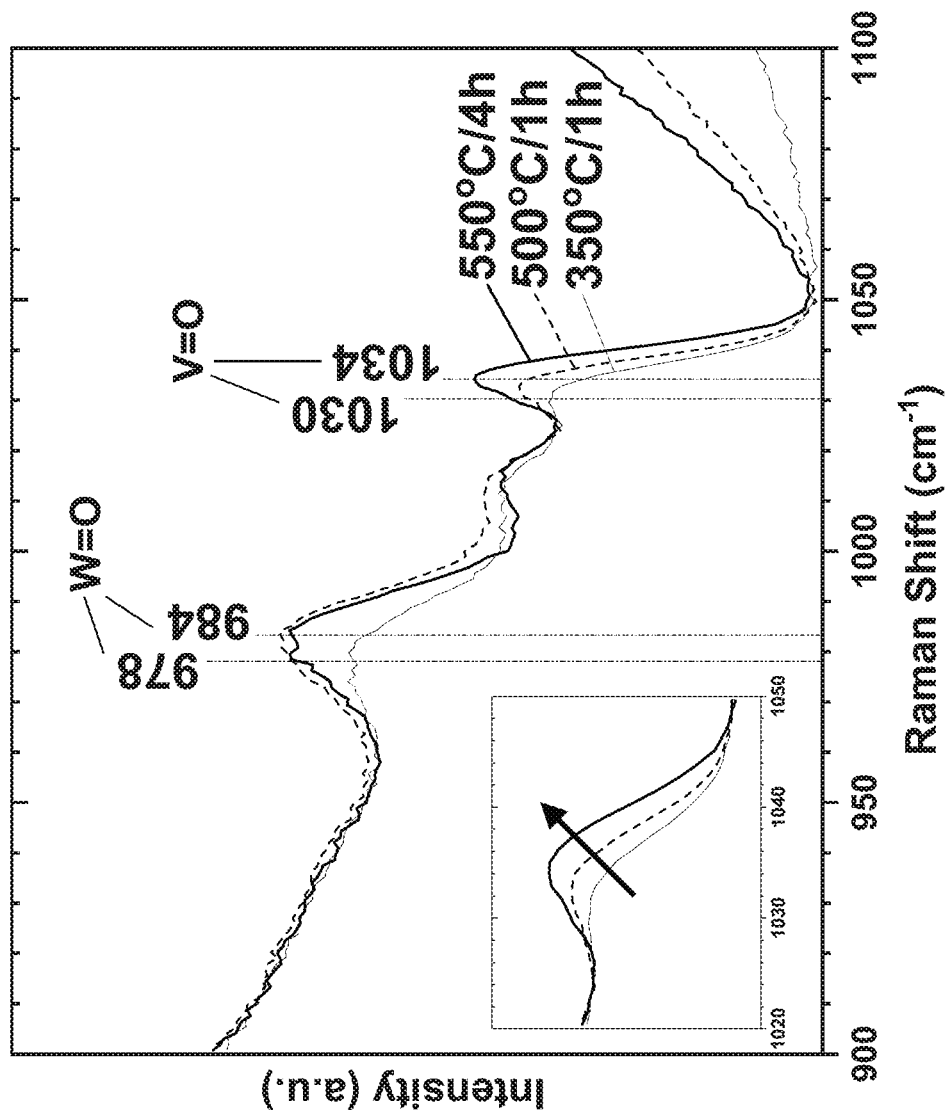
FIG. 5 illustrates a plot of Raman spectroscopy data for various samples, according to an embodiment.

FIG. 5 illustrates a plot of Raman spectroscopy data for various samples, according to an embodiment. The plot shows in situ Raman spectroscopy of a humidity treated commercial $V_2O_5$—$WO_3/TiO_2$ catalyst. The catalyst was further (hydro)thermally treated at 350° C., 500° C. or 550° C. The bands at 970-1034 $cm^{-1}$ are related to V=O and W=O stretching vibrations of the surface $VO_x$ and $WO_x$ species. All the bands shift to higher wavenumbers upon progressive (hydro)thermal treatments (e.g., from 1030 to 1034 $cm^{-1}$), indicating greater oligomerization of both surface $VO_x$ and $WO_x$ species with increasing temperature. After humidity treatment, the surface vanadia species can be dispersed. The plot shows that higher temperature thermal treatments induce greater oligomerization of the $VO_x$ and $WO_x$ species. The higher temperature thermal treatments are correlated with higher reactivity of the catalyst, indicating that greater oligomerization is correlated with higher reactivity of the catalyst.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. A method of recovering catalyst performance, comprising:
    providing a vanadium selective catalytic reduction (VSCR) catalyst;
    exposing the VSCR catalyst to a first humidity level in a range of 50%-100% relative humidity, at a first temperature in a range of 20° C.-100° C., for a first period of time of at least two hours; and
    thermally treating the VSCR catalyst at a second temperature in a range of 300° C.-600° C. for a second period of time of at least one hour.

2. The method of claim 1, wherein:
    the first humidity level is in a range of 50%-95% relative humidity.

3. The method of claim 1, wherein:
    the second temperature is in a range of 400° C.-600° C.

4. The method of claim 1, wherein:
    the second temperature is in a range of 500° C.-600° C.

5. The method of claim 1, wherein:
    in the step of providing the VSCR catalyst, the VSCR catalyst comprises clusters of vanadium oxide.

6. The method of claim 5, wherein:
    the step of exposing the VSCR catalyst to the first humidity level disperses the clusters of vanadium oxide.

7. The method of claim 1, wherein the first period of time is at least 5 hours.

8. The method of claim 1, wherein the second period of time is less than or equal to 48 hours.

9. The method of claim 1, wherein:
    the step of providing the VSCR catalyst comprises providing the VSCR catalyst as part of a vehicle system.

10. The method of claim 1, wherein:
    the step of providing the VSCR catalyst comprises providing the VSCR catalyst in an environmental chamber.

11. The method of claim 1, wherein:
    the first humidity level is in a range of 70%-95% relative humidity.

12. A method of manufacturing vanadium selective catalytic reduction (VSCR) catalyst, comprising:
    sintering vanadium oxide;
    exposing the vanadium oxide to a first humidity level in a range of 50%-100% relative humidity, at a first temperature in a range of 20° C.-100° C., for a first period of time of at least two hours; and
    thermally treating the vanadium oxide at a second temperature in a range of 300° C.-600° C. for a second period of time of at least one hour.

13. The method of claim 12, wherein:
    the first humidity level is in a range of 50%-95% relative humidity.

14. The method of claim 12, wherein:
    the second temperature is in a range of 400° C.-600° C.

15. The method of claim 12, wherein:
    the second temperature is in a range of 500° C.-600° C.

16. The method of claim 12, wherein the vanadium oxide comprises clusters of vanadium oxide.

17. The method of claim 16, wherein:
    the step of exposing the vanadium oxide to the first humidity level disperses the clusters of vanadium oxide.

18. The method of claim 12, wherein the first period of time is at least 5 hours.

19. The method of claim 12, wherein the second period of time is less than or equal to 48 hours.

20. The method of claim 12, wherein:
    the first humidity level is in a range of 70%-95% relative humidity.

* * * * *